United States Patent
Huisma et al.

(10) Patent No.: US 6,868,804 B1
(45) Date of Patent: Mar. 22, 2005

(54) ANIMAL MANAGEMENT SYSTEM

(75) Inventors: Camiel Huisma, Airdrie (CA); Alison Sunstrum, Airdrie (CA)

(73) Assignee: Growsafe Systems Ltd., Airdrie (CA)

( * ) Notice: Subject to any disclaimer, the term of this patent is extended or adjusted under 35 U.S.C. 154(b) by 0 days.

(21) Appl. No.: 10/717,690

(22) Filed: Nov. 20, 2003

(51) Int. Cl.[7] .......................... A01K 1/10; A01K 11/00
(52) U.S. Cl. ................. 119/842; 119/51.02; 340/573.3
(58) Field of Search ............................... 119/842, 840, 119/51.02; 340/573.3, 573.1

(56) References Cited

U.S. PATENT DOCUMENTS

| | | | |
|---|---|---|---|
| 2,513,753 A | 7/1950 | Sheldon | 119/75 |
| 4,247,758 A | 1/1981 | Rodrian | 377/6 |
| 4,288,856 A | 9/1981 | Linseth | 364/567 |
| 4,463,706 A | 8/1984 | Meister et al. | 119/51 |
| 4,517,923 A | 5/1985 | Palmer | 119/51 |
| 4,532,892 A * | 8/1985 | Kuzara | 119/51.02 |
| 4,617,876 A | 10/1986 | Hayes | 119/155 |
| 4,618,861 A | 10/1986 | Gettens et al. | 340/825.54 |
| 4,757,784 A | 7/1988 | Hammer | 119/75 |
| 4,864,158 A | 9/1989 | Koelle et al. | 327/31 |
| 5,084,710 A | 1/1992 | Whittington | 343/876 |
| 5,128,669 A | 7/1992 | Dadds et al. | 340/901 |
| 5,143,257 A | 9/1992 | Austin et al. | 222/57 |
| 5,309,864 A | 5/1994 | Harmsen et al. | 119/51.02 |
| 5,428,363 A | 6/1995 | D'Hont | 343/742 |
| 5,653,192 A | 8/1997 | Sheen et al. | 119/51.02 |
| 5,711,246 A | 1/1998 | Yano et al. | 119/51.02 |
| 5,729,236 A | 3/1998 | Flaxl | 342/374 |
| 5,901,660 A | 5/1999 | Stein | 119/51.02 |
| 6,111,508 A * | 8/2000 | Ensor et al. | 340/573.2 |
| 6,427,627 B1 | 8/2002 | Huisma | 119/51.02 |
| 6,497,197 B1 | 12/2002 | Huisma | 119/75 |
| 6,516,746 B2 * | 2/2003 | Pratt | 119/51.02 |
| 6,664,897 B2 * | 12/2003 | Pape et al. | 340/573.3 |

FOREIGN PATENT DOCUMENTS

| | | | |
|---|---|---|---|
| DE | 3623816 | 1/1987 | A01K/1/10 |
| DE | 197 24 550 | 12/1998 | A01K/5/02 |
| EP | 0 624 313 | 11/1994 | A01K/11/00 |
| SU | 628860 | 10/1978 | A01K/29/00 |

* cited by examiner

Primary Examiner—Yvonne R. Abbott

(57) ABSTRACT

A highly automated non-confining system to continuously, or at selected time intervals identify, measure, monitor and manage the consumption behavior, substance intake, body weight and growth of individual animals in their usual production environment including range, pasture, feedlot, dairy and farm without disruption to typical behaviors in order to determine, analyze, model and predict a variety of conditions relating to animal health, productivity, efficiency and quality. A transmitter generally attached to the animal identifies the individual animal by a unique individual code. A weighing device measures animal weight while an animal is consuming substances. An antenna receives the unique signal from the transmitter and a transmitting and receiving device sends acquired signals to a computer and receives instructions from a computer. A computer acquires signals and modification factors incorporated in the computer generate an event or interval measurement of an animal's weight and gain, growth rate and substance consumption, and the animal behavior affecting the measurement. A visual identification mechanism marks cattle that the computer system has determined require intervention. The system models and predicts animal health and growth, performance, carcass characteristics, feed utilization, manure and methane output.

20 Claims, 5 Drawing Sheets

ANIMAL MANAGEMENT SYSTEM

FIELD OF THE INVENTION

This invention relates to an animal identification, measurement, monitoring and management system and a method of using the same in an animal production environment, more specifically, a system, which is capable of being used with multiple transmitters to automatically and continuously monitor the consumption behavior of individual animals; determine substance intake, and measure body weight and growth in order to predict and determine a variety of conditions relating to health, performance, production efficiency, quality and safety and moreover to visually mark an animal enabling intervention.

BACKGROUND OF THE INVENTION

Over the past forty years or so passive radio frequency identification has been used to automatically identify objects. One example of a practical application of this technology has resulted in electronic identification of individual animals. The basic elements of such systems include a reader/transmitter, an antenna and a transponder. The reader/transmitter sends an electromagnetic charge wave through the antenna to the transponder, which uses this energy to transmit a radio frequency signal back through the antenna to the reader/transmitter. Typically, the signal includes an identification code unique to each transponder. In order to monitor the activities of large herds or confined groupings of animals, one must be able to monitor multiple transponders in a relatively small area. With currently available technology it is extremely difficult to read multiple transponders using one reader/transmitter.

If each one of the multiple transponders uses the same frequency to transmit its unique identification code back to the reader/transmitter, a single reader/transmitter is unable to readily decipher each individual identification code. In order to make systems with multiple transponders operational, multiple reader/transmitters are required which, in turn, render such systems costly, and will also reduce the area in which the transponders can be simultaneously read.

Water accounts for 50–80% of an animal's weight and is involved in every physiological process. Feed intake is directly related to water intake. Measuring water consumption behavior will enable the delineation of the role of variability in water intake in the etiology of metabolic disorders. Measuring water intake will provide the information required to determine an individual animal's feed intake and utilization of feed relative to efficiency, weight gain and performance including beef production and milk output. It has been determined that behavioral changes precede metabolic disease (Sowell et al., Basarab et al.).

Determining the weight of an animal at various growth stages presently requires the directing of individual animals through a chute, stall, restraining gate, crush or squeeze equipped with a weighing device. Such practice is generally far more expensive than the potential financial gain obtained by such measurement because the animals are often bruised and stressed by this procedure, which may impact the feeding behavior and weight of the animals. Chute processing may require up to three feedlot or farm personnel. Handling, sorting and crowding is a major stressor in cattle. Excessive stress during handling lowers livestock productivity. Cattle are often placed in a holding pen from which they are pushed through walkways, often assisted by electric prods, before they are captured in the chute. Research has shown that cattle that become agitated in the squeeze chute have significantly lower weight gain and may be more susceptible to disease. The process of weighing cattle itself causes shrink (Grandin et al.) Similar stress responses have been recorded in swine weighed in crates and stalls.

Measuring body weight while an animal is drinking has been demonstrated in other inventions (U.S. Pat. No. 4,617, 876 and U.S. Pat. No. 4,288,856). In these inventions, the animal must be confined to a stall physically separating the animal from its pen mates. Research has indicated that animals perform better in a group environment where they can feed and drink side by side. To individually measure animals, these inventions require complex gate mechanisms ensuring that only one animal remains on the scale for a certain time. Large animal weight platforms or scales are difficult to maintain due to excessive manure buildup. Rudimentary partial body weighing and measurement have been used to estimate weight in situations where full body weight measurement devices are impractical. These systems include measuring body girth with a measuring tape and similar. These methods are typically rule of thumb and do not provide a level of commercially acceptable accuracy and/or practicality. Research in pigs has demonstrated that a front leg weight can be collected while an animal is feeding provided one animal is restricted access to a weight platform.

Some systems and/or methods have attempted to determine optimal slaughter point by forecasting end weight from measurements taken on intake to a feedlot (U.S. Pat. No. 6,318,289). Often these predictive measurements suffer from inaccuracies due to subjective assessment on intake, actual performance in the feedyard differing from projected, and effect of sickness on weight gain and performance. In the aforementioned patent, the inventor suggests that weights can be taken with greater frequency than on arrival, but this is accomplished through a series of complicated and expensive gates, photosensors and scale placements. Animals are provided access to an individual scale stall through shuttle gates, and gate arms must block the animal into the scale stall before a weight measurement can be acquired.

Automatic monitoring in the feedyard will keep operators continuously and accurately apprised of the health, gain efficiency and performance of each individual animal. The system enables the removal of non-performing animals early in the feeding process. This type of monitoring will enable accurate tracking of cost of gain. The comprehensive audit trail created by the system gives food inspection agencies the ability to quickly zero in during a period of disease outbreak and potentially prevents diseased animals from entering the food chain.

SUMMARY OF THE INVENTION

Wherefore, it is an object of the present invention to overcome the aforementioned problems and drawbacks associated with the prior art, it is further an objective to provide a highly automated, non-confined, management system and method to allow continuous or time selected measurement of consumption behaviors, substance intake, weight and growth and the determination and monitoring of healthy and sick animals and their performance without disruption of typical animal behaviors in their usual environments which includes on farm, in feedlot, in dairy and/or on pasture.

A further object of the invention is to provide a transmission/receiving mechanism to facilitate transmission and receiving of data from the panel by means of wireless RF technology. Such remote transmission minimizes the amount of wiring that is necessary for use in this system and avoids the need to have a plurality of wires running from the remote data collection locations to a central monitoring location. The running of such wires, especially in agricultural environments, is costly and such wires can also readily become damaged and/or disconnected.

A further objective of the invention is to allow one transmitter decoder to receive signals from a plurality of transmitters.

A further objective of the invention is to assimilate data combining both data mining and data modeling techniques. Data mining will seek individual animal and group correlations between large behavior, health, consumption and intake data sets the system acquires. Data modeling tools will further analyze observational and measured data using probability and what if simulation models to provide an improved predictive system. The outcome of this analysis will be the determination of the best economic method or interval at which to manage, treat and market animals thus providing the maximum return on investment to the operator.

BRIEF DESCRIPTION OF THE INVENTION

The invention will now be described, by way of example, with reference to the accompanying drawings in which.

DETAILED DESCRIPTION OF THE INVENTION

Figure 1:
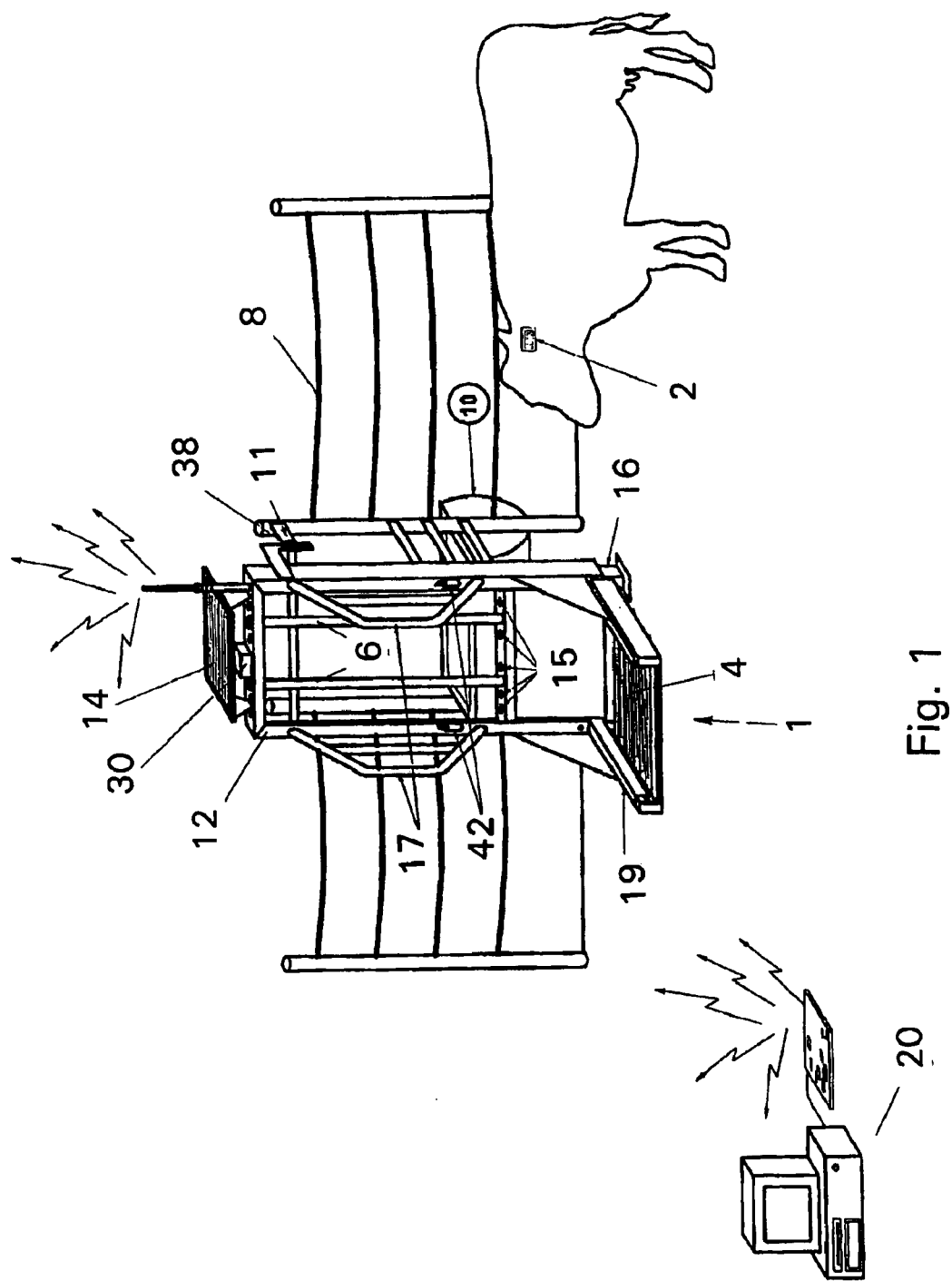
FIG. 1 is a perspective view of the system where one measurement unit identifies, measures, monitors and visibly marks an animal in accordance with the teaching of the present invention.

Turning now to FIG. 1, a brief, general description concerning the various components of the present invention will now be briefly discussed. By way of a general description the present invention individually identifies an animal by using a transmitter (2) generally attached to, Injected, implanted or ingested by a particular animal which identifies the individual animal by a unique signal. This transmitter may be of the type distributed by Allflex USA, manufactured by TIRIS, a business unit of Texas Instruments. It is appreciated that a transponder includes the function of a transmitter and, therefore, may be interchangeable therewith in the following embodiments of the invention.

The invention further comprises a non-confining measurement unit (1) by which it is to be understood that an animal is not physically confined by the structure of the measurement unit (1). The animal is free to come and go at its own will with respect to interaction with the measurement unit (1). A panel (30) of the type manufactured by GrowSafe Systems Ltd., Airdrie, Alberta, Canada mounted to the measurement unit receives the unique animal identification signal via an antenna (12) from the transmitter (2). An electronic signal transmitting and receiving device enclosed in the panel (30) sends acquired signals to the remote computer (20) and receives Instructions from a remote computer (20). The measurement unit (1) consists of a weight platform (4) and load bars (19) which measure partial body weight of animals while they consume substances. The load bars (19) measure any weight applied to the weight platform (4). The neck bars (6) and neck guides (17) position one animal on the weight platform (4). The neck bars (6) can be positioned in different bar positions (15) allowing for different size animals. Due to the size of the weight platform (4) and the alignment of the neck bars (6), the animal must place its front legs on the weight platform (4) and insert its head through an opening between the bars (6) to consume from the consumption location (10). This ensures that both front legs of the animal are on the weight platform (4) and minimizes the forces, which can transfer to the load bars (19) when the animal comes in contact with the measurement unit (1). Thus, only the vertical forces exerted by the animal's forelegs are being measured. With this type of measurement unit (1), the transmitter (2) located generally on the neck and head portion of the animal is then brought into close proximity with the antenna (12), which can be placed in the rim or outer frame of the measurement unit structure or incorporated into the neck bars (6).

An animal marking device (42) visibly marks animals requiring intervention by spraying a single color combination of colors while the animal is consuming substances. This enables visible identification and or sorting of animals in the production environment by behavior characteristics, group adaptation or lack thereof, weight and growth or lack thereof, or consumption patterns. This type of visual marking will enable specific types of animals such as bullers or aggressive animals to be removed from the pen.

Supporting brackets (11) attach the structure to a consumption location (10). The supporting brackets (11) include a location transmitter (38), which is read by the panel (30) to confirm the geographical location of the measurement unit (1). The measurement unit (1) is also equipped with adjustable legs (16), which can be raised or lowered. The weight platform (4) is supported by load bars (19), and essentially also by the supporting brackets (11) and the adjustable legs (16). The weight platform (4) is positioned substantially parallel but spaced between about 1 to 8 inches from the ground. The weight platform (4) is suspended from the ground due to the tendency of animal manure and mud to build up in the vicinity of the apparatus. The free space below the weight platform (4) and cantilevered nature of the weight platform (4) permits cleaning of the area around the weight platform (4) to be undertaken with little obstruction. The measurement unit (1) is placed in front of the consumption location, (10) which may be positioned along the existing fence line (8) and limits more than one animal consuming from one measurement unit (1) at one time. A solar panel (14) can be used to provide power to the system if a conventional power source is not available.

Figure 1A:
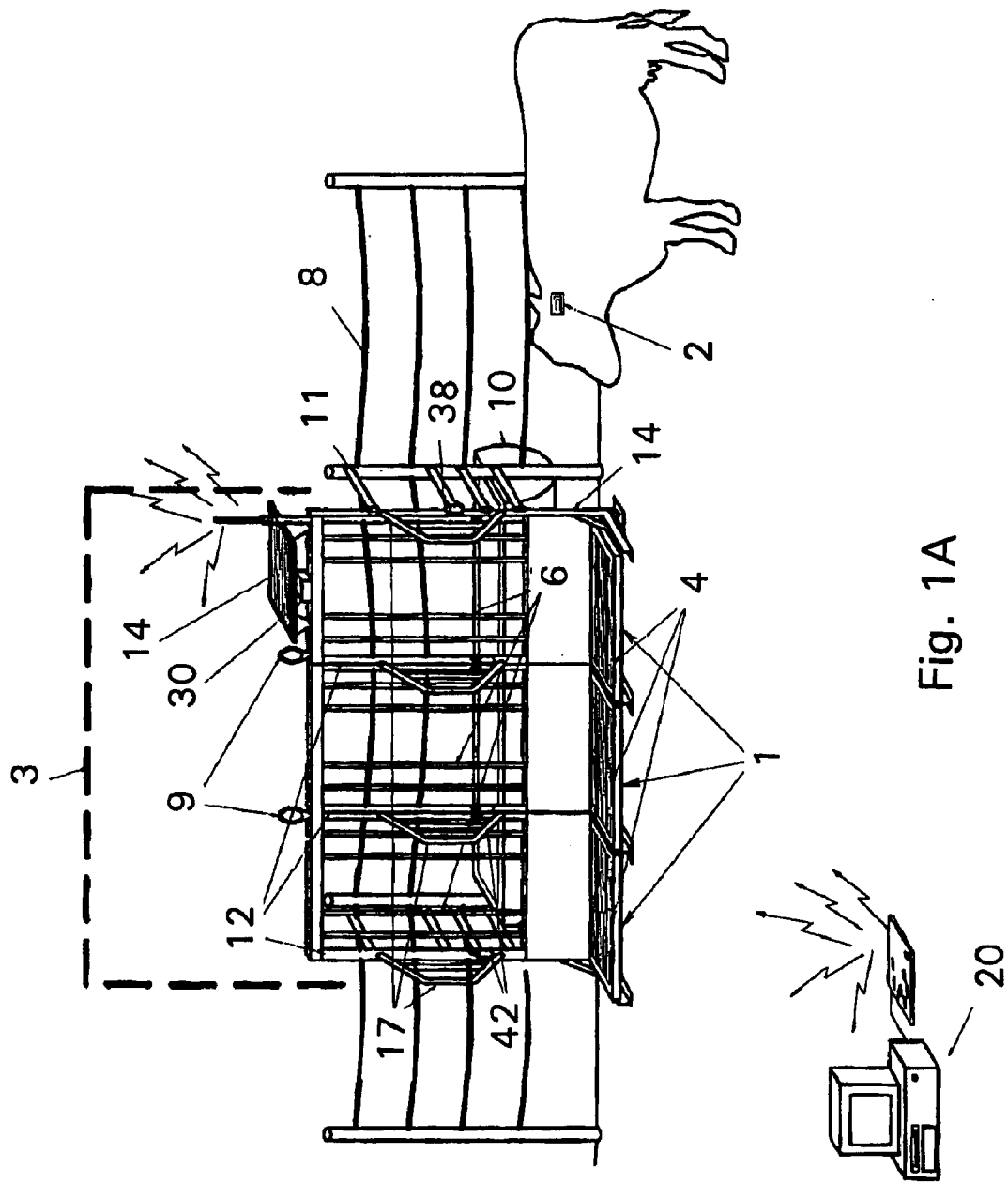
FIG. 1A is a perspective view of the system incorporating multiple measurement units.

Turning now to FIG. 1A, the diagram further demonstrates how a plurality of individual measurement units (1) can be joined or bolted together to form an expanded measurement unit (3) capable of individually measuring one or several animals. This configuration allows multiple animals to consume at the same time in production environment without segregation or confinement from their pen mates. Different feed yards typically have different widths for either food or water troughs herein referred to as consumption locations (10). The panel (30) mounted to the expanded measurement unit (3) consisting of a plurality of individual measurement units (1) can receive the unique signal from a plurality of antennas (12). An electronic signal transmitting and receiving device enclosed in the panel (30) sends acquired signals to a remote computer (20) and receives instructions from a remote computer (20).

Just as in a single measurement unit (1), the neck bars (6) and neck guides (17) position one animal on the weighing device. (4). An animal marking device (42) visibly marks animals by spraying a single or combination of colors while the animal is consuming substances. Supporting brackets (11) attach the structure to a consumption location (10). One of the supporting brackets (11) include a location transmitter (38) which is read by the panel (30) to confirm the geographical location of the measurement unit (1). The measurement unit (1) is equipped with adjustable legs (16), which can be raised or lowered. The weight platform (4) is supported by load bars (19), the supporting brackets (11), and the adjustable legs (16). The expanding measurement unit (3) is placed in front of the consumption location (10), which may be positioned along the existing fence line (8). One solar panel (14) can be used to provide power to the system if a conventional power source is not available. The measurement unit (1) is semi-portable and can be lifted into the pen by the lug rings (9) and may be moved in the pen using a front-end loader or; if supplied with wheels, wheeled into the pen by an attached trailer. When an animal located within his typical environment wishes to begin a consumption activity, the design of the measurement unit (1) positions him on the weight platform (4) and the neck guides (17) ensure that the antenna (12) can read the transmitter (2).

Figure 2:
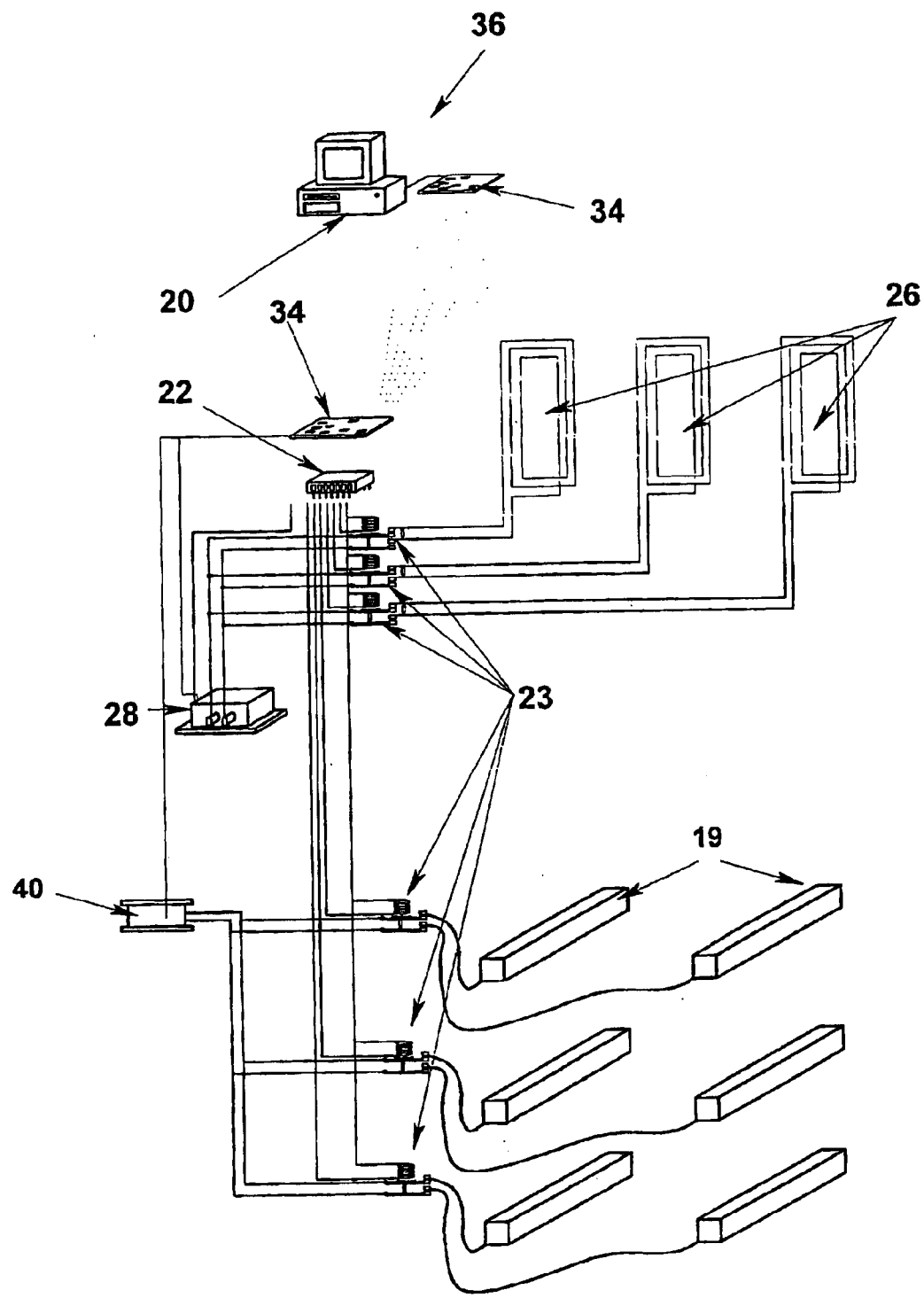
FIG. 2 is a diagrammatic schematic representation showing details of the various components comprising the system of the present invention.

Turning now to FIG. 2, a further description of the related electronics and method of utilizing the same is provided and, by way of using an exemplary animal to describe the following process, a further description of the related electronics and method of utilizing the same is provided. The animal equipped with the transmitter (2) places his front two legs on the weight platform (4) and his head through the neck bars (6) to begin consumption.

The transmitter (2) signal received by the antenna (12) is relayed via the switching mechanism (23) to the signal to code translator (28). From the signal to code translator (28) the signal is now translated into a unique code, which becomes the system's individual animal identification number. The processor (22) sequences the switching mechanisms (23). The unique code is then relayed to the transmitting and receiving device (34).

The analog signal collected by the load bars (19) is translated into a digital signal by the conversion unit (40) and then relayed to the transmitting and receiving device (34). The transmitting and receiving device (34) transfers the data to the remote computer (20).

Figure 3:
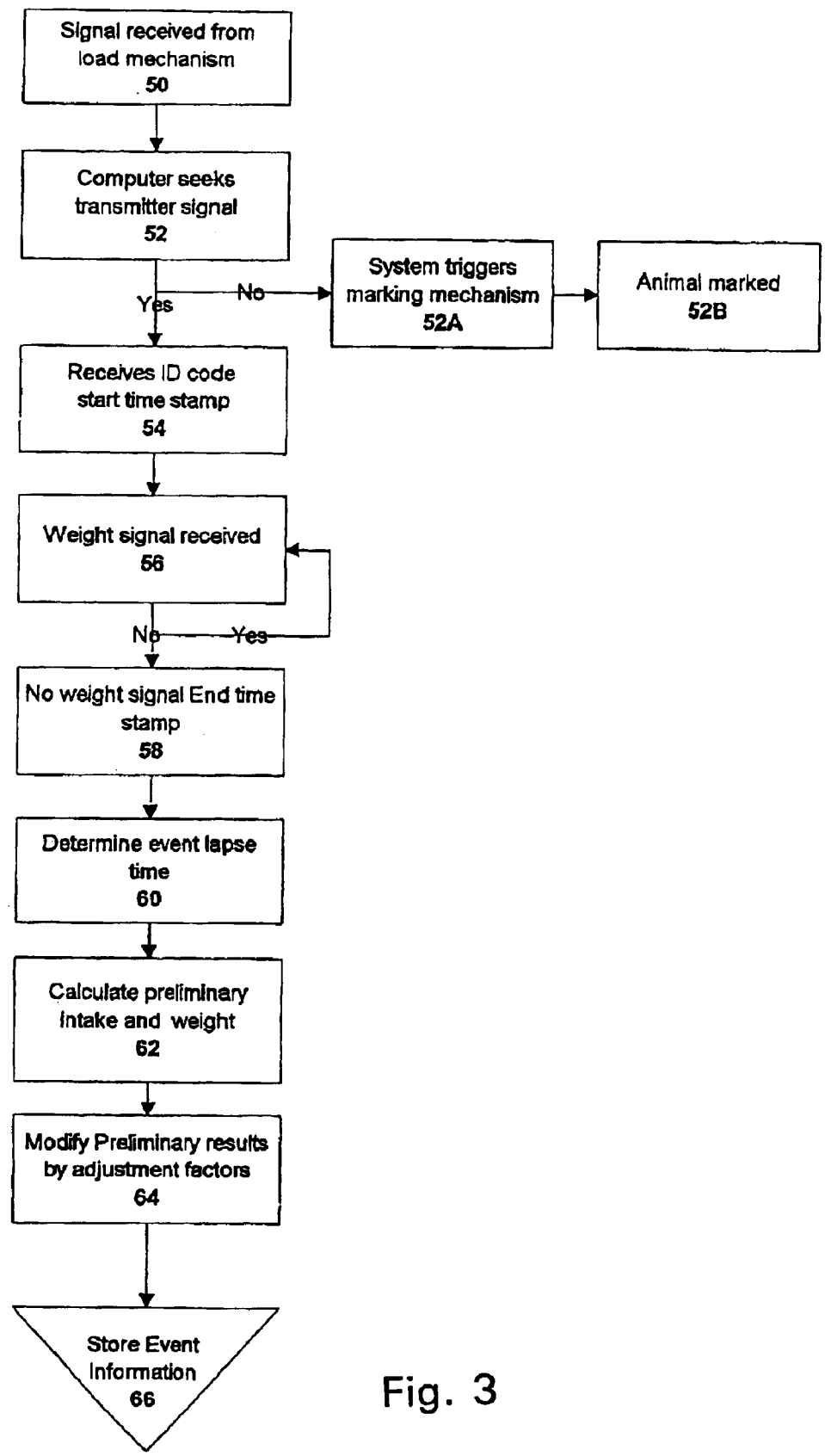
FIG. 3 is a flow diagram for determining event definition and preliminary individual animal measurements.

Turning now to FIG. 3, the animal weight signal the computer (20) receives is filtered to determine if the calculated weight would be greater than 20 kg. The system continuously measures weight signals measured by the load bars (FIG. 2-19), this determines changes in platform weight due to ice, manure and other buildup. The system automatically retards and compensates for this buildup. If the signal's calculated weight is determined to be greater than 20 kg, the computer at Step 52 seeks a unique identification code that will identify the animal at the consumption location. When the unique identification code is received the computer at Step 54 starts a time stamp to acquire data for the commenced consumption event. If the computer at Step 52 does not identify a unique identification code and weight greater than 20 kg would be calculated, the computer at Step 52A triggers the marking mechanism and at Step 52B the animal is marked. In this manner, the computer will identify and mark any animal that may have lost their transmitter. At Step 56 the signal continues to be received by the computer indicating that the consumption event continues. At Step 58 if the computer does not receive a weight signal for a period longer than a certain time period, usually a period of 60 seconds the computer generates an event end time stamp. At Step 60 the computer determines the lapsed time of the event. At Step 62 the computer calculates a start weight and an end weight for the consumption period. The difference being these two measurements is the weight recorded and a preliminary indicator of intake for the event. At Step 64 the computer modifies the preliminary results by adjustment factors, which include a conversion from the partial body weight measurement to a full body weight measurement. At Step 66 the computer stores unique information in individual animal files for further analysis.

Figure 4:
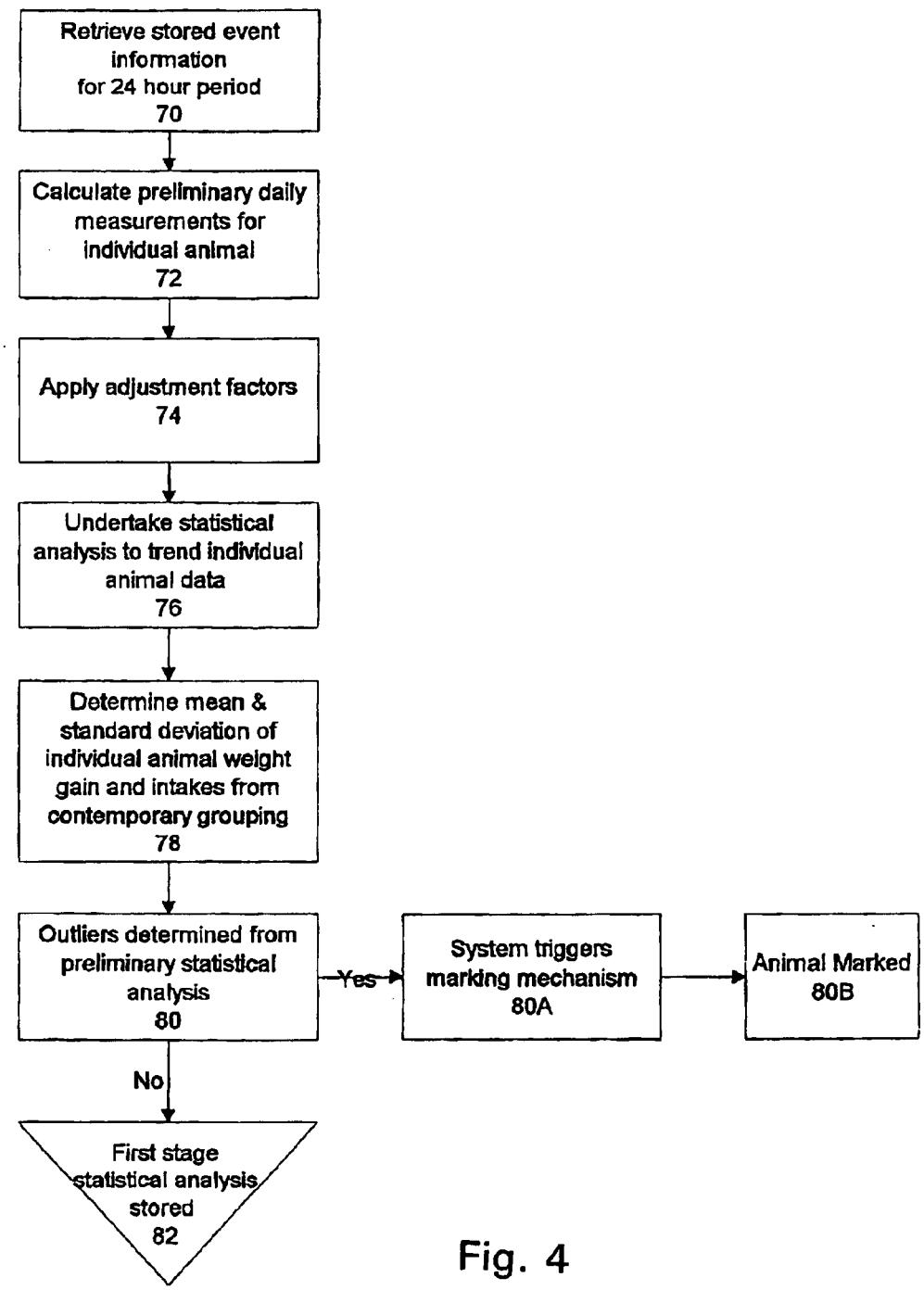
FIG. 4 shows a flow diagram for performing a level of statistical data and identifying statistical outliers.

Turning now to FIG. 4, the computer retrieves event information and assembles the data into an interval period. Samples may be segmented in 0 to 24:00 hour intervals. At Step 70 this period in the diagram is described as a 24:00 hour interval.

Preliminary daily measurements for each individual animal are calculated and then at Step 74 known adjustment factors may be applied to enhance daily calculations. These adjustment factors may include compensation for environmental impact on both measurement equipment and animals such as temperature, humidity, rain snow and extremes of any of these. Amount of mud in the pen may also be considered. At Step 76, the computer begins the statistical analysis on individual animal data. This includes linear regression of animal weight from all data collected in the interval period and to date. This analysis enables individual animal growth to be graphically represented and further manipulated in the computer. At Step 78, the computer determines the mean and standard deviation of individual animal weight, behavior and consumption intake from previous interval data and then compares this to an animal's contemporaries. The any grouping relevant to management. At Step 80, statistical outliers are determined from this process. At Step 80A, the system will trigger the marking mechanism If an outlier has been identified and, at Step 80B, the system will mark the animal for intervention. Generally speaking a statistical outlier will have demonstrated or sustained certain norm deviant behavior, norm deviant gain or norm deviant substance intake for the entire interval or a set interval before the computer will trigger the mechanism at Step 80A. At Step 82, the first level statistical analysis is stored and will provide the criteria for reports that may be generated by management which include daily weight, gain growth, intake behavior and deviations from norm and or contemporary groupings.

The system integrates growth, nutrition, health, management and economics into testable models that enable management to perform best choice marketing and management decision-making. The computer classifies each animal into a specific state which might include healthy, gaining, finished and within these, as in the case of disease, may be able to determine whether an animal is in a state of sub-clinical or clinical disease. Individual animals identified as statistical outliers have been flagged for intervention. These animals may have left a normal state such as healthy and/or performing or they may be transitioning into a beneficial state such as market ready. The models attach costs to the different states and the instances at which they appear, and thus provide management with the ability to determine or study the most economical path to treat, market or otherwise intervene. The computer uses probabilities to describe the chance that something moves from one state to another. On the basis of assumed probabilities the computer constructs a transition matrix that predicts or studies the likelihood and cost or benefit of an animal transitioning from one state to another. Some of the states such as gaining or losing weight can be readily observed in the data the system collects. Other states may be underlying and not readily observed. The system uses markov chain models, semi markov models, hidden markov models and other advanced data modeling tools to study the data the system acquires. With continued data acquisition the models seek the hidden or underlying states and adapts model parameters to respond to newly acquired knowledge.

We claim:

1. A highly automated system for managing individual animals in a production environment comprising:

a transmitter attached, implanted or ingested on or by a particular animal which identifies the particular animal by a unique signal, a measurement unit positioned in front of a consumption location comprising:

an antenna mounted to the unit that receives the unique signal from the transmitter;

a weighing device that measures partial body weight of animals while they consume substances, an electronic signal transmitting and receiving device that acquires signals from the antenna and weighing device to send acquired signals to a computer and receive instructions from a computer;

an animal marking device that visually colors a particular animal while they consume substances, a computer that acquires, assembles and analyzes data received from the measurement device and other sources and sends marking instructions to the measurement unit.

2. The system according to claim 1 comprising a plurality of measurement units in front of a single consumption location enabling:

a plurality of transmitter signals from the plurality of antennas to be sent to one electronic signal transmitting and receiving device, a plurality of signals from a plurality of weighing devices positioned in front of one consumption location to be sent to one electronic signal transmitting and receiving device, a plurality of measurement units to be powered from one conventional or solar powered source.

3. The system as set forth in claim 1, wherein multiple consumption locations are monitored and managed.

4. The system as set forth in claim 1, wherein the marking device can visually identify animals with at least one of a single, multiple colors and or an absence of color.

5. The system as set forth in claim 1, wherein the measurement unit incorporates neck guides that form an access port permitting solely the head of one animal to pass through the access port which optimally positions the animal on the weight platform and in the desired range of the antenna.

6. The system as set forth in claim 1, wherein an individual animal is identified and measured without substantially confining the animal from his pen mates.

7. The system as set forth in claim 1, wherein a transmitting device is affixed to the consumption location to identify a geographical location of the measurement units.

8. The system as set forth in claim 1, wherein the measurement units are portable:

enabling movement to alternative geographical locations, allowing sharing of the units amongst locations, enabling maintenance of the measurement unit.

9. The system as set forth in claim 1, wherein the weight platform is sized to accommodate only the front legs of an animal.

10. The system as set forth in claim 1 whereby the weight platform can easily be separated from the measurement unit to enable cleaning.

11. The system as set forth in claim 1 further determining:

weight gain and growth from partial weight signals received, full body weight from partial weight signals received using a modification factor, a more accurate modification factor by associating weight gathered by other weight measurement devices.

12. The system as set forth in claim 1, wherein the measurement unit is supported by two legs and incorporates an adjusting mechanism to raise or lower the unit in relationship to the mounting surface.

13. The system as set forth in claim 1, wherein the computer determines whether an animal has lost a transmitter or the transmitter has ceased to function.

14. The system as set forth in claim 1, wherein the computer determines an interval head count and inventory of all animals monitored by the system.

15. The system as set forth in claim 1, wherein the computer determines an animal's gain and growth at intervals.

16. The system as set forth in claim 1, wherein the computer determines consumption intake by measuring the increase in weight during an event in combination with duration of the event.

17. The system as set forth in claim 1, wherein the computer determines the state of an animal and its deviation or transition from this state.

18. The system as set forth in claim 1, wherein animals may be sorted or segregated in the production environment based on its determined state.

19. The system as set forth in claim 1, wherein the computer determines and recommends when an animal should be marketed.

20. The system as set forth in claim 1, wherein the computer determines when an animal should be treated and whether feed, feed additives, water, minerals, growth promoting substances or supplements should be given.

* * * * *